![](United States Patent Office)

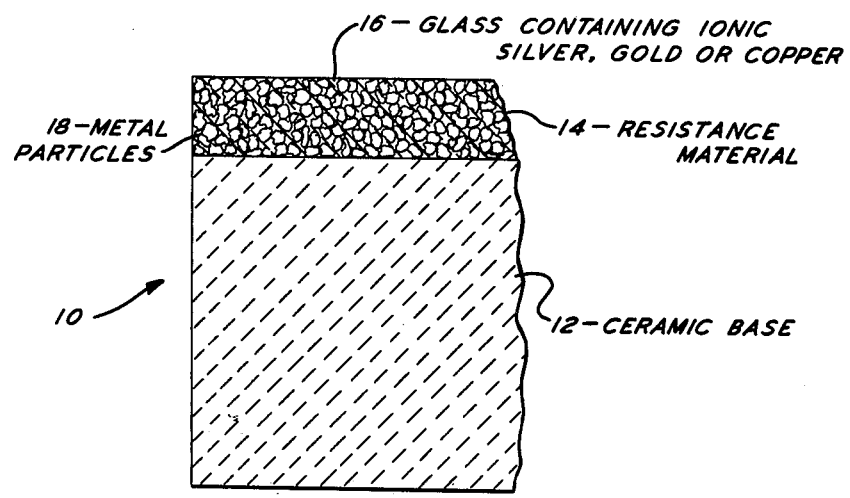

3,154,503
Patented Oct. 27, 1964

3,154,503
RESISTANCE MATERIAL AND RESISTOR MADE THEREFROM
Bhogaraju V. Janakirama-Rao, Philadelphia, and Remington Murphy, Roslyn, Pa., assignors to International Resistance Company, Philadelphia, Pa.
Filed Jan. 12, 1961, Ser. No. 82,164
6 Claims. (Cl. 252—514)

The present invention relates to a resistance material and a resistor made therefrom. More particularly, the present invention relates to an enamel type resistance material and a resistor made therefrom.

One type of electrical resistor comprises a base or substrate of an electrical insulating material, such as a ceramic, coated with a layer of a resistance material. The resistance material generally comprises fine particles of a conductive material, such as carbon or a metal, suspended in a carrier material. It has been recently suggested to form an enamel type resistance material in which the carrier is a glass frit and the conductive material is fine particles of a metal or a mixture of metals. The conductive metals which have been found particularly good for use in the enamel type resistance material are the noble metals, such as gold, silver, platinum, palladium and rhodium and mixtures of such noble metals. Resistors are formed from such glass frit, conductive metal resistance enamels by coating a base or substrate with the enamel and heating the unit to fire the glass frit, and thereby bond the resistance material to the base.

However, a number of problems have arisen with the enamel type resistance material compositions so far suggested. It has been found that the glass frit when fired has poor wettability. The poor wettability of the glass frit provides poor adhesion between the enamel and the base or substrate. Also, it provides poor adhesion between the glass and the conductive metal particles, and poor statistical distribution of the metal particles in the glass, both of which adversely affect the electrical properties of the enamel resistance material. Another problem with such resistance enamels arises from the high cost of the noble metals used therein. In order to obtain the proper conductivity of the resistance enamels, the enamel must contain a percentage of the noble metal which is large when considering the cost of the metal.

It is an object of the present invention to provide a novel resistance material.

It is another object to provide a novel enamel type resistance material.

It is still another object of the present invention to provide an enamel type resistance material including a glass frit having improved wettability.

It is a further object of the present invention to provide an enamel type resistance material which uses smaller amounts of the conductive metal to decrease the cost of the material.

It is still a further object of the present invention to provide an improved electrical resistor having an enamel type resistance coating.

Other objects will appear hereinafter.

The invention accordingly comprises a composition of matter possessing the characteristics, properties, and the relation of constituents which will be exemplified in the composition hereinafter described, and the scope of the invention will be indicated in the claims.

The drawing is a cross-sectional view, on a highly exaggerated scale, of a resistor produced in accordance with the present invention.

In general, the enamel type resistance material of the present invention comprises a vitreous frit containing either silver, gold, copper or mixtures thereof in the ionic state mixed with a finely divided conductor of palladium, platinum, rhodium or mixtures thereof. The proportions of the glass frit and the finely divided conductor in the enamel resistance material of the present invention may be by weight 99% to 50% glass frit, and 1% to 50% conductor. The glass frit may be a borosilicate frit, lead borosilicate frit, cadmium, barium, calcium or oher borosilicate frit which contains the silver, gold, copper or mixture thereof in the ionic state. The glass frit may contain from 1% to 25% of the silver, gold, copper or mixture thereof calculated by weight of the oxide of the additional metal.

To form a resistor, the enamel resistance material of the present invention may be applied to a substrate or base of an electrical insulating material, such as a ceramic, and fired to fuse the glass frit and bond the frit and the conductor to the substrate or base. For ease of application of the enamel resistance material to the base or substrate, the enamel composition may be mixed with a vehicle, such as butyl carbitol acetate or toluol, to form a liquid or paste. The liquid or paste can then be applied to the base or substrate by dip coating, spraying, screen printing or roller coating.

As shown in the drawing, a resultant resistor of the present invention is generally designated as 10. Resistor 10 comprises the ceramic base or substrate 12 having a layer 14 of the resistance material of the present invention coated and fired thereon. The resistance material layer 14 comprises the glass 16 containing the silver, gold, copper or mixture thereof in the ionic state, and the finely divided metal particles 18 dispersed throughout the glass 16.

As previously stated, the glass frit of the enamel resistance material of the present invention may be a borosilicate frit, lead borosilicate frit, cadmium, barium, calcium, or other borosilicate frit which contains silver, gold or copper in the ionic state. Examples of some preferred glass frits which can be used with the proportions being by weight are as follows:

| | Percent |
|---|---|
| PbO | 65 to 80 |
| $B_2O_3$ | 1 to 10 |
| $SiO_2$ | 10 to 40 |
| $Ag_2O$ | 1 to 24 |
| | |
| BaO | 40 to 70 |
| CaO | 1 to 15 |
| $B_2O_3$ | 10 to 35 |
| $SiO_2$ | 15 to 30 |
| $Ag_2O$ | 1 to 20 |

In each of the above examples of the glass frit, the silver oxide can be replaced by similar amounts of either a gold containing material, such as a gold resinate, or a copper containing material, such as a copper oxide.

The following examples are given to illustrate certain specific compositions of the glass frit which can be used in the enamel resistance material of the present invention and the method of making the compositions, it being understood that the details of the examples are not to be taken as in any way limiting the invention thereto.

EXAMPLE I

A lead borosilicate glass frit containing silver ions is prepared from a raw batch containing

| | Grams |
|---|---|
| PbO | 78 |
| $B_2O_3$ | 6 |
| $SiO_2$ | 17 |
| $Ag_2O$ | 10 |

The raw batch materials are mixed in a ball mill and then placed in a fused silica crucible. The crucible and its contents are heated in a globar furnace to 1200° C. and maintained at that temperature for 15 to 30 minutes. The molten glass is then poured into cold water. The resultant coarse fritted material is then ball milled to a particle size of preferably less than one micron.

EXAMPLE II

An alkaline earth metal borosilicate glass frit containing silver ions is prepared from a raw batch containing

| | Grams |
|---|---|
| BaO | 50 |
| CaO | 10 |
| $B_2O_3$ | 20 |
| $SiO_2$ | 20 |
| $Ag_2O$ | 5 |

The raw batch was treated in the same manner as the raw batch of Example I except that it was heated to a temperature of 1260° C. to 1280° C. and maintained at that temperature for 30 minutes.

To form the enamel resistance material of the present invention, the glass frit of the present invention, which contains the silver, gold or copper in an ionic state, is mixed with the finely divided particles of palladium, platinum, rhodium or mixtures thereof in the proportions by weight of 99% to 50% glass frit and 1% to 50% conductive particles. The amount of the conductive particles in the resistance material determines the conductivity of the material with the conductivity increasing with an increasing amount of the conductive particles. The conductive particles of the enamel resistance material of the present invention may also be mixed with finely divided particles of other noble metals, such as silver and gold. For example, the enamel resistance material may comprise the following in proportions by weight:

| | Percent |
|---|---|
| Glass frit of the present invention | 50 to 84 |
| Palladium | 11 to 28 |
| Silver | 8 to 22 |

The following example is given to illustrate the manner of making an enamel resistance material of the present invention, it being understood that the details of the example are not to be taken as in any way limiting the invention thereto.

EXAMPLE III

A resistor composition is prepared by mixing 70% by weight of the glass frit of the present invention of either of Examples I or II, 16.8% palladium black, and 13.2% silver flake, and a vehicle of either butyl carbitol acetate or toluol in sufficient amount to obtain the desired consistency. The mixture is ball milled for 24 to 96 hours to obtain the lowest possible average particle size, viz., less than half a micron. The viscosity of the enamel resistance material is adjusted by either removing some of the vehicle by vacuum evaporation, or by adding additional amounts of the vehicle to permit proper application of the resistance material. The resistance material is applied to a ceramic substrate by either dip coating, spraying, screen printing or roller coating, and then fired to fuse the material to the substrate. The enamel resistance material using the glass frit of Example I is fired at a temperature of approximately 650° C., and the enamel resistance material using the glass frit of Example II is fired at a temperature of 775° C. to 800° C.

We have found that the introduction of the silver, gold or copper in the ionic state into the glass frit improves the melting of the frit so as to improve its wettability. In addition, it improves the overall performance of the electrical properties of the enamel resistance material in that it permits the obtaining of the desired conductivity of the material with a smaller amount of the finely divided conductor.

In an enamel type resistance material, the conductive metal particles exist as isolated islands in the glassy matrix. When an electrical potential difference is applied across such a resistance film, conduction takes place between the conductive metal particles through the glassy matrix, which glassy matrix is normally an insulator. It is felt that the improved wettability of the glass frit of the resistance material of the present invention improves the adherence between the glassy matrix and the conductive metal particles so as to improve the conductive properties of the resistance material.

Also, the electronic configuration of the silver, gold or copper ions in the glass frit of the present invention is such that the ions are deficient in an electron so that the ions can momentarily act as an electron acceptor. However, the electronic configuration of the platinum, palladium or rhodium metal of the conductive particles is such that they have a full quota of electrons and can act as an electron donor. For this reason, it is felt that when an electrical potential difference is placed across the enamel resistance material of the present invention, the silver, gold or copper ions in the glassy matrix act as a bridge between the isolated islands of the conductive metal particles by accepting and passing on an electron, and thereby improves the conductivity of the enamel resistance material.

As an example of the improvement in the conductivity provided by the enamel resistance material of the present invention, the enamel type resistance materials of the compositions shown in Table I were coated on a ceramic substrate and fired at the indicated temperatures. The enamel resistance materials of Examples A and B differ in composition only by the amount of the conductive metal particles used, with the composition of the glass frit being the same. However, the Example C is an enamel resistance material of the present invention in that the glass frit, which is basically the same as the glass frits of Examples A and B, contains silver ions in the amount of 25% by weight of $Ag_2O$.

Table I

| Example | Glass Frit | Conductor | Firing Temp., °F. | Resistance, Ohms/square |
|---|---|---|---|---|
| A | Lead Borosilicate glass. | 5% Pd black | 1,400 | $10^8$ |
| B | ___do___ | 12% Pd black | 1,500 | $3.4 \times 10^5$ |
| C | Lead Borosilicate glass + 25% Ag in ionic state. | 1% Pd black | 1,400 | 6.5 |

As can be seen from Table I, the enamel resistance material of Example A has a resistance of $10^8$ ohms per square inch, which is so high as to be considered nonconductive. By more than doubling the amount of the conductive metal particles in the enamel resistance material, Example B, the resistance of the material merely decreased to $3.4 \times 10^5$ ohms per square inch, which is considered barely conductive. However, the enamel resistance material of the present invention, Example C, has a resistance of 6.5 ohms per square inch, which is a high degree of conductivity. Thus, the addition of the silver, gold or copper ions to the glass frit not only greatly increases the conductivity of the enamel resistance material, but does so with the use of much less of the conductive metal particles.

As previously stated, the silver, gold or copper ions are provided in the glass frit of the present invention by the addition of the metals in the form of oxides, resinates or the like, which materials are much less expensive than the substantially pure metals of the conductive metal particles. Therefore, the reduction in the amount of the conductive metal particles required to achieve a desired resistance value provided by the addition of the silver, gold or copper ions to the glass frit of the enamel resistance material of the present invention also reduces the cost of the resistance material of the present invention.

It will thus be seen that the objects set forth above, among those made apparent from the preceding description, are efficiently attained and, since certain changes may be made in the above composition of matter without departing from the scope of the invention, it is intended that all matter contained in the above description shall be interpreted as illustrative and not in a limiting sense.

We claim:

1. A vitreous enamel resistance material adapted to be applied to and fired on a ceramic substrate to form an electrical resistor comprising a finely divided metal selected from the group consisting of palladium, platinum and rhodium, and a glass frit containing in the ionic state a metal selected from the group consisting of silver, gold and copper, all of the second said metal being in the glass in the ionic state.

2. A vitreous enamel resistance material in accordance with claim 1 including 1% to 50% of the finely divided metal, and 99% to 50% of the glass frit.

3. A vitreous enamel resistance material in accordance with claim 2 in which the glass frit contains 1% to 25% of the metal calculated by weight of the oxide of the metal.

4. An electrical resistor comprising a ceramic substrate and a layer of a vitreous enamel resistance material fired on the surface of said substrate, said resistance material comprising a glass containing in the ionic state a metal selected from the group consisting of silver, gold and copper, and finely divided metal particles selected from the group consisting of palladium, platinum and rhodium embedded in and dispersed throughout the glass, all of the first said metal being in the glass in the ionic state.

5. A resistor in accordance with claim 4 including 1% to 50% by weight of the finely divided metal particles embedded in the glass.

6. A resistor in accordance with claim 5 in which the glass contains 1% to 25% of the metal calculated by weight of an oxide of the metal.

References Cited in the file of this patent

UNITED STATES PATENTS

| | | |
|---|---|---|
| 2,515,275 | Stookey | July 18, 1950 |
| 2,515,936 | Houston | July 18, 1950 |
| 2,530,217 | Bain | Nov. 14, 1950 |
| 2,924,540 | D'Andrea | Feb. 9, 1960 |

FOREIGN PATENTS

| | | |
|---|---|---|
| 577,383 | Canada | June 9, 1959 |
| 855,625 | Great Britain | Dec. 7, 1960 |